(12) United States Patent
Schuh et al.

(10) Patent No.: US 11,060,005 B2
(45) Date of Patent: Jul. 13, 2021

(54) CATIONICALLY POLYMERISABLE POLYACRYLATE CONTAINING ALKOXYSILANE GROUPS AND USE THEREOF

(71) Applicant: TESA SE, Norderstedt (DE)

(72) Inventors: Christian Schuh, Hamburg (DE); Alexander Prenzel, Hamburg (DE); Sarah Bamberg, Hamburg (DE)

(73) Assignee: TESA SE, Norderstedt (DE)

( * ) Notice: Subject to any disclaimer, the term of this patent is extended or adjusted under 35 U.S.C. 154(b) by 101 days.

(21) Appl. No.: 15/771,818

(22) PCT Filed: Oct. 10, 2016

(86) PCT No.: PCT/EP2016/074196
§ 371 (c)(1),
(2) Date: Apr. 27, 2018

(87) PCT Pub. No.: WO2017/080732
PCT Pub. Date: May 18, 2017

(65) Prior Publication Data
US 2019/0062606 A1    Feb. 28, 2019

(30) Foreign Application Priority Data
Nov. 9, 2015 (DE) .................. 10 2015 222 028.1

(51) Int. Cl.
| | | |
|---|---|---|
| C09J 143/04 | (2006.01) | |
| C08F 220/18 | (2006.01) | |
| C09J 7/38 | (2018.01) | |
| C08F 220/32 | (2006.01) | |
| C08F 230/08 | (2006.01) | |
| C08F 30/08 | (2006.01) | |
| C08F 20/32 | (2006.01) | |

(52) U.S. Cl.
CPC .......... *C09J 143/04* (2013.01); *C08F 220/18* (2013.01); *C08F 220/32* (2013.01); *C08F 230/08* (2013.01); *C09J 7/385* (2018.01); *C08F 20/32* (2013.01); *C08F 30/08* (2013.01); *C09J 2301/414* (2020.08); *C09J 2433/00* (2013.01)

(58) Field of Classification Search
CPC ....... C09J 143/04; C08F 30/08; C08F 230/08; C08F 230/085; C08F 220/32; C08F 20/32
See application file for complete search history.

(56) References Cited

U.S. PATENT DOCUMENTS

| | | | |
|---|---|---|---|
| 3,542,585 A | 11/1970 | Heit et al. | |
| 5,747,599 A * | 5/1998 | Ohnishi | ............... C08G 59/687 525/327.3 |
| 5,789,487 A | 8/1998 | Matyjaszewski et al. | |
| 5,854,364 A | 12/1998 | Senninger et al. | |
| 5,945,491 A | 8/1999 | Matyjaszewski et al. | |
| 6,140,445 A | 10/2000 | Su et al. | |
| 8,420,735 B2* | 4/2013 | Hamada | .................. C08L 33/14 525/54.21 |
| 2004/0026003 A1 | 2/2004 | Dux et al. | |
| 2012/0171433 A1* | 7/2012 | Qiu | ....................... C08F 220/22 428/195.1 |

(Continued)

FOREIGN PATENT DOCUMENTS

| | | |
|---|---|---|
| CN | 101993512 A | 3/2011 |
| CN | 102666591 A | 9/2012 |

(Continued)

OTHER PUBLICATIONS

International Search Report for corresponding application PCT/EP2016/074196 dated Nov. 11, 2016.

(Continued)

*Primary Examiner* — Ling Siu Choi
*Assistant Examiner* — David L Miller
(74) *Attorney, Agent, or Firm* — Norris McLaughlin PA

(57) ABSTRACT

The present invention relates to a cationically polymerizable composition comprising or consisting of:

(a1) 35 to 90 wt % of at least one (meth)acrylic ester of the general formula (I)

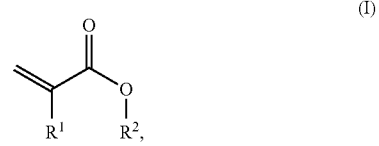

(I)

in which $R^1$ is selected from H and $CH_3$ and $R^2$ is a linear or branched alkyl chain having 1 to 30 carbons;

(a2) 5 to 30 wt % of at least one olefinically unsaturated monomer having at least one cationically polymerizable functional group;

(a3) 5 to 30 wt % of at least one alkoxysilane-modified (meth)acrylic ester;

(a4) optionally 5 to 30 wt % of at least one N-vinyl-substituted lactam; and (a5) optionally up to 5 wt % of at least one (meth)acrylic ester different from (a1) and/or of at least one olefinically unsaturated monomer which is copolymerizable with components (a1) to (a4).

The invention further relates to a pressure sensitive adhesive and also to a structural pressure sensitive adhesive, which are obtainable by polymerization and optional subsequent additional crosslinking of such a composition, and also to the use of these pressure sensitive adhesives.

14 Claims, No Drawings

(56) References Cited

U.S. PATENT DOCUMENTS

| | | | |
|---|---|---|---|
| 2012/0171481 A1 | 7/2012 | Ha et al. | |
| 2013/0123405 A1 | 5/2013 | Prenzel et al. | |
| 2014/0303274 A1* | 10/2014 | Liu | C09J 133/06 522/31 |
| 2014/0308452 A1 | 10/2014 | Schuemann et al. | |

FOREIGN PATENT DOCUMENTS

| | | | |
|---|---|---|---|
| CN | 102782072 A | | 11/2012 |
| CN | 104099046 A | | 10/2014 |
| DE | 19949352 A1 | | 4/2000 |
| DE | 10361540 A1 | | 7/2005 |
| DE | 102004031188 A1 | | 1/2006 |
| EP | 0621931 B1 | | 7/1997 |
| EP | 1209177 A1 | | 5/2002 |
| EP | 1394199 A1 | | 3/2004 |
| EP | 1456321 B1 | | 4/2007 |
| EP | 1976912 B1 * | | 7/2009 ............ A61K 8/0241 |
| EP | 1658319 B1 | | 11/2009 |
| EP | 2160443 B1 | | 10/2010 |
| EP | 2518087 A1 | | 10/2012 |
| JP | 0328283 A | | 2/1991 |
| JP | 10212329 A | | 8/1998 |
| JP | 2010024377 A * | | 2/2010 |
| WO | 9624620 A1 | | 8/1996 |
| WO | 9801478 A1 | | 1/1998 |
| WO | 9844008 A1 | | 10/1998 |
| WO | 9931144 A1 | | 6/1999 |
| WO | 0153385 A1 | | 7/2001 |
| WO | 2004060946 A1 | | 7/2004 |
| WO | 2011112643 A | | 9/2011 |
| WO | 2012061032 A1 | | 5/2012 |
| WO | 2012177337 A1 | | 12/2012 |
| WO | 2011078142 A1 | | 5/2013 |
| WO | 2013096272 A1 | | 6/2013 |
| WO | 2013103334 A1 | | 7/2013 |
| WO | 2016066435 A1 | | 5/2016 |

OTHER PUBLICATIONS

Written Opinion of the International Searching Authority for corresponding application PCT/EP2016/074196 dated Nov. 11, 2016 (English translation not available).

T.G. Fox, "Influence of Diluent and of Copolymer Composition on the Glass Temperature of a Polymer System", Bull. Am. Phys. Soc., No. 1, p. 123, (1956).

Mayadunne, et al., "Living Polymers by the Use of Trithiocarbonates as Reversible Addition—Fragmentation Chain Transfer (RAFT) Agents: ABA Triblock Copolymers by Radical Polymerization in Two Steps", Macromolecules, American Chemical Society, 2000, vol. 33, pp. 243-245.

Hinkamp, "Communication, A table of Fikentscher K Values versus relative viscosities for a concentration of 1 0", Polymer 8, 1966, pp. 381-384.

J.V. Crivello, et al., "Epoxidized Triglycerides as Renewable Monomers in Photoinitiated Cationic Polymerization", Chem. Mater., 1992, vol. 4, pp. 692-699.

English translation of CN Office Action issued in corresponding application CN 201680076427.7 dated Feb. 3, 2020.

* cited by examiner

CATIONICALLY POLYMERISABLE POLYACRYLATE CONTAINING ALKOXYSILANE GROUPS AND USE THEREOF

This is an application filed under 35 USC 371 based on PCT/EP2016/074196 filed 10, Oct. 2016, which in turn is based on DE 10 2015 222028.1 filed 09, Nov. 2015. The present application claims the full priority benefit of these prior applications and herein incorporates by reference the full disclosures of these prior applications.

The present invention relates to a cationically polymerizable composition comprising a (meth)acrylic ester, an olefinically unsaturated monomer having at least one cationically polymerizable functional group, and an alkoxysilane-modified (meth)acrylic ester. The invention further relates to a method for producing a pressure sensitive adhesive from such a composition, to the pressure sensitive adhesive itself, and to the use thereof.

PRIOR ART

The term "structural adhesive" is understood generally to refer to a highly loaded adhesive which is intended to ensure a possible constructional design with high strength and/or stiffness in conjunction with largely uniform and favorable distribution of stresses. Moreover, this term also characterizes the requirement for an adhesive bond to provide durable fulfilment, without failure, of the demands made of it, both mechanically and as a consequence of aging events. Chemically reacting polymer systems form the basis for structural adhesives. The curing reaction may take place by supply of heat, mixing of resin and curing agent, atmospheric moisture, or UV radiation.

In the chemically reacting systems, two reaction partners mixed with one another generally bring about the formation of an adhesive layer (two-component reactive adhesives, or one reaction partner finds the second "component" needed for the reaction in the chemical conditions of the adhesive bond (e.g., moisture), and/or this component is released by an external stimulus such as, for example, by thermal energy or UV radiation (one-component reactive adhesives). These systems are usually liquid in order to enable greater ease of application and hence to allow the curing reaction to take place quickly and with high conversions on the basis of better diffusion of the reactive components. This, however, carries the disadvantage that the adherend parts must be fixed until setting occurs. In view of the necessary applied pressure associated with the fixing, it is possible here for the adhesive to be squeezed out at the edges of the bond.

Pressure sensitive adhesives (PSAs) in turn are used in a host of applications, since they offer numerous desired, characteristic features, such as removability and ease of application, for example. For a more durable and very smooth bond, conventional PSAs frequently lack the requisite strength to maintain their adhesion on specific substrates. Possibly, moreover, on application to certain materials, a conventional PSA is not capable of withstanding exposure to elevated temperatures or high moisture levels. The application of a PSA, for example, on polymethyl methacrylate and polycarbonate panels, which are known for "outgassing materials" and as being difficult to bond, may result in blistering and delamination.

In contrast, structural PSAs typically possess not only the customary polymers which are used in PSAs but also thermally crosslinking components, producing very high peel resistance values, which may attain orders of magnitude like those of a structural adhesive.

Curable adhesives (e.g., heat-cured or photo-cured) are used in applications where substrates require a considerable stability and a high-strength adhesion. Conventional curable adhesives, however, are normally not provided as PSAs and also not in a form which is easy to apply, such as a tape, for example. For optical product applications (e.g., glazing systems), curable adhesives are desirable, since they ensure optically clear, strongly adhering laminates (e.g., layered substrates).

In order to achieve both strength and ease of application, hybrid compositions have been developed.

Conventional curable adhesives contain basic reactive chemical building blocks, an example being epoxy adhesives, which contain epoxide groups. On curing, these basic building blocks are able to join with one another via the epoxide groups, with the aid of a curing agent, and to form a stable, three-dimensional network. This formation of a network is a substantial reason for the generally high strengths and good adhesive properties of epoxy adhesives on a large number of materials.

Hybrid compositions are distinguished by the incorporation of further materials into this network structure. Approaches include in particular the production of interpenetrating networks (IPNs) or other multiphase structures. In the case of a semi-interpenetrating network, a linear, noncrosslinked polymer combines with a first, crosslinked polymer, with the first crosslinked polymer being synthesized in the presence of the other polymer. The noncrosslinked polymer penetrates the network of the crosslinked polymer with the effect that interlocks and interloops render the two components virtually inseparable physically. This semi-interpenetrating network allows the properties of two polymers to be combined even when they are thermodynamically incompatible.

Such networks with mutual penetration may be produced sequentially (from polymer A and monomer B) or simultaneously (from monomer A and monomer B). Preference is given to combining an elastomer and a glasslike polymer, such as a polyurethane and a polyacrylate. The product, depending on the proportions, is a reinforced elastomer or a resin with high impact strength.

IPN systems may vary very greatly in their chemical composition. There are essentially two techniques for their synthesis:

The simultaneous technique involves combining two linear polymers, prepolymers or monomers of types A and B with the respective crosslinking agents in the liquid state, in other words in bulk, in the melt, in solution or in dispersion, and simultaneously carrying out polymerization and/or crosslinking. In this case it is necessary to select substances which do not react with one another.

The sequential technique involves swelling a crosslinked polymer A with a monomer of type B and then carrying out polymerization and/or crosslinking of the monomer in situ with addition of crosslinking agents.

IPN systems are examples of polymer mixtures where there is no phenomenon of macroscopic phase separation. Normally, the mixing of polymers leads to multiphase systems, owing to the well-known thermodynamic incompatibility of the majority of polymers. This incompatibility results from the relatively low entropy gain from mixing of polymers, this being a result in turn of the fact that the substantial length of the chains limits their possibilities for contact. Where, however, products of relatively low molecular weight are mixed and subsequently polymerized and crosslinked simultaneously, it is possible to achieve kinetic control of the phase separation.

Relative to commonplace polymer blends, interpenetrating networks are notable for better resistance to separation, and often for advantageous mechanical properties. The degradation resistance of the interpenetrating networks is commonly better than that of copolymers in which the incompatible polymers are connected to one another covalently in the form of blocks. Consequently, IPNs are also used in the area of adhesives.

There are epoxy resin adhesives known which additionally include a further kind of basic building blocks which, via a second chemical mechanism, form an independent network and are unable to react with the epoxide-containing building blocks. When these adhesives are cured, therefore, two mutually independent adhesive networks are formed which are in mutual penetration, i.e., IPNs. Viewed practically, such systems consist of two adhesives in one system, the properties of which complement one another synergistically in the ideal scenario.

Epoxy resins generally have poor miscibility with other polymers. If mixing is nevertheless attempted, polymers tend in general toward separation of the phases introduced. If success is nevertheless achieved in mixing the actual noncrosslinked and nonpolymerized basic building blocks of the polymers, and if, subsequently, they are polymerized in such a way as to prevent phase separation of the polymers formed, it is possible to observe effects of synergy in the resultant polymer mixture. For properties such as the bond strength or impact strength, the levels achieved are often significantly higher than for individual networks investigated separately (e.g., pure epoxy adhesives).

The effect of the technology of IPN modification of adhesives therefore lies in the exploitation of synergy effects which are exhibited only in the combination of two networks but cannot be observed in the individual networks. Results of this frequently include a maximization of the desired properties and a possible minimization of unwanted properties.

IPNs are also known from the area of PSAs, including the area of structural PSAs.

EP 0 621 931 B1 describes hybrid adhesives which are produced from an acrylate syrup namely a solution of polyacrytes, produced by a low conversion polymerization, in the remaining acrylate monomers and epoxide monomers, and therefore form a simultaneous IPN. A PSA can be obtained only if the reaction comes to a stop before complete curing has taken place (B-stage). In this condition, the pressure sensitive adhesive film must generally be stored with cooling, which is a drawback.

WO 2004/060946 describes an adhesive composition which comprises an acrylate copolymer, acrylated oligomers, and an initiator which triggers a radical polymerization. A semi-IPN is formed that leads to a highly transparent adhesive, this being achieved through the combination of acrylate copolymers with acrylate oligomers. Disadvantages are that these formulations are based purely on acrylates, which in some cases do not ensure sufficiently high bond strengths, and the circumstance that in this case similar classes of compound are being combined with one another, meaning that the spectrum of synergistic effects that can be achieved is narrower than in the case of different classes of compound.

WO 2012/061032 discloses adhesives in which a reactive isocyanate prepolymer has been dispersed in a styrene block copolymer PSA and this prepolymer, after crosslinking mediated by atmospheric moisture, forms a semi-IPN within the PSA phase. A disadvantage of these PSAs is that they have to be stored away from moisture.

EP 1 658 319 B1 describes a molding composition comprising a mixture of interpenetrating polymers having a first phase of a crosslinked isobutene polymer and a second phase of a stiffening polymer that comprises (meth)acrylic and/or vinylaromatic units, the first phase comprising the reaction product of an isobutene polymer having on average at least 1.4 functional groups in the molecule and of a crosslinking agent having on average at least two functional groups in the molecule, these groups having a functionality complementary to that of the functional groups of the isobutene polymer. The IPN here may be produced simultaneously or sequentially—with the crosslinked isobutene phase as the network introduced to start with. As a result of the crosslinking of the PIB, the examples do not disclose any pressure sensitively adhesive molding compositions.

In order to improve the compatibility of the first phase with the second phase, the accompanying use of polymeric compatibilizing agents—polyethylene glycols, for example—is proposed. The polymeric compatibilizing agents are preferably crosslinked. The polymeric compatibilizing agent is able in this way to form a network which penetrates the first phase. A disadvantage of this kind of compatibilization is the high complexity of the now ternary system, which makes it more difficult to control the properties.

EP 2 160 443 B1 discloses a semi-interpenetrating network having a first phase of a linear, noncrosslinked isobutene polymer and a second phase of a crosslinked polymer, the crosslinked polymer being obtained by means of a crosslinking molecular enlargement reaction in the presence of the isobutene polymer. In the version which is preferred and supported with examples, the crosslinked polymer is obtained by radical polymerization of ethylenically unsaturated monomers, particularly of styrene and methacrylates. It is found, however, that such systems lose strength significantly at temperatures of 80° C. or more.

One common method for carrying out impact modification of high-strength reactive adhesives is the production of a two-phase polymer morphology, with a microheterodisperse phase of a thermoplastic or elastomeric polymer having a low glass transition temperature of below −20° C., in a continuous matrix of a polymer having a high glass transition temperature of more than 100° C. In this case, there are generally discrete spherical soft-phase domains, with diameters of between 0.1 and 10 µm, in homogeneous distribution within the matrix.

One common method for generating such two-phase morphologies, in epoxy resin adhesives, for example, is to add an endgroup-modified, epoxide-reactive polybutadiene-co-acrylonitrile copolymer to the uncured epoxy resin. In this case the thermoplastic polymer must be soluble in the uncured epoxy resin, but in the course of the curing reaction must be incompatible with the epoxy resin polymer, so that phase separation occurs in the course of curing. When the gel point is reached, the phase separation process is stopped, and so the thermoplastic or elastomeric polymer is present in the form of microscopic spherical domains in the epoxy resin matrix.

EP 1 456 321 B1 proposes a multiphase reactive adhesive wherein the binder matrix of the cured reactive adhesive comprises a continuous phase consisting of an optionally crosslinked polymer (P1) having a glass transition temperature of more than 100° C., preferably of more than 120° C., in which a heterodisperse phase is dispersed that consists of individual, continuous regions of a thermoplastic or elastomeric polymer P2 having a glass transition temperature of less than −30° C. Dispersed within this phase formed by P2 is a further thermoplastic or elastomeric polymer P3 having a glass transition temperature of less than −30° C. Moreover, the continuous phase P1 contains in dispersed form a further heterodisperse phase made of the thermoplastic or elastomeric polymer P3 having a glass transition temperature of less than −30° C., with P3 not being the same as P2. The continuous phase P1 is preferably an epoxy resin. No description is given of PSAs.

DE 10 2004 031 188 A1 and DE 103 615 40 A1 disclose adhesives which consist at least of a) an acid- or acid anhydride-modified vinylaromatic block copolymer and b) an epoxide-containing compound. As a result of the chemical crosslinking of the resins with the elastomers, the strengths achieved within the adhesive film are very high. In order to increase the adhesion, it is also possible to add tackifier resins that are compatible with the elastomer block of the block copolymers. In this way, essentially, the epoxy resin acts as a crosslinking agent for the modified elastomers and forms to a small extent, at most, a separate second phase, meaning that these systems additionally exhibit the general weakness of vinylaromatic block copolymer PSAs, namely a low thermal shear strength.

WO 2012/177 337 A1 describes a UV-crosslinkable acrylate syrup containing epoxides. Following the preparation of the prepolymer—the syrup—by means of UV-activated radical polymerization, it is mixed with a cationic photoinitiator and also with epoxy monomers as well as the rest of the radically polymerizable monomers. The syrup is applied as a coating and then polymerized radically and cationically to completion, and simultaneously crosslinked, on the web. This process and also the product in which it results are unsuitable for subsequent cationic crosslinking, or else the radical and the cationic photoinitiators have to be harmonized with one another such that two are activated by an entirely different wavelength range. The selection of commercially available initiators, however, is very small. Another disadvantage, moreover, are the acid-functionalized ethylenic monomers in the acrylate, these monomers admittedly being described only as optional, but being nevertheless used in every example of the specification; their presence gives rise to a risk of thermal initiation of the cationic polymerization, meaning that the products are not stable in storage.

Another problem attending the aforesaid compositions is that, while they do possess good adhesion, in general, on dry substrates, the adhesion achieved on damp surfaces is not satisfactory. This is true both of bonding on damp surfaces and also of the durability of the bond when the bonded component is exposed to a damp environment over a prolonged period of time. In order to counter this problem, WO 2013/103334 A1 proposes a system wherein epoxy-modified acrylates are used with epoxy-modified silanes in order to boost the adhesion in the crosslinked state. While a system of this kind is able to improve the adhesion on damp surfaces, the addition of the low molecular mass silanes leads to a reduction in the cohesion in the noncrosslinked state, and this may be perceived as a disadvantage.

The literature further proposes the use of oligomeric alkoxy-silanes in order to increase adhesion on damp surfaces. Systems of this kind are described in, for example, U.S. Pat. No. 6,140,445 A, WO 2001/053385 A1, WO 2013/096272 A1, and EP 1 394 199 B1. The alkoxy-silanes described here, however, which are oligomeric, are liquid under standard conditions and, moreover, also have plasticizer properties, both of these factors being possibly disadvantageous to the production of structural PSAs.

OBJECT OF THE INVENTION

The object of the invention was therefore to provide a cationically polymerizable composition for producing a structural PSA which by virtue of the balanced adhesive and cohesive properties is suitable for the preliminary fixing of different adherends but is not squeezed out in a way that may foul the adherends or lead to optical defects. At the same time, the structural PSA is to possess good bonding properties on damp substrates, especially on damp glass substrates. The structural PSA is to be curable by actinic radiation, allowing bond strengths to be achieved whose order of magnitude is similar to that obtained with structural adhesives.

ACHIEVEMENT OF THE OBJECT

The object is achieved by means of a cationically polymerizable composition comprising or consisting of:
(a1) 35 to 90 wt % of at least one (meth)acrylic ester of the general formula (I)

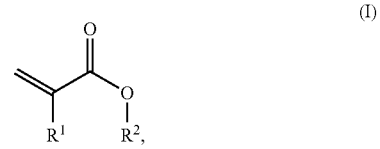

in which $R^1$ is selected from H and $CH_3$ and $R^2$ is a linear or branched alkyl chain having 1 to 30 carbons;
(a2) 5 to 30 wt % of at least one olefinically unsaturated monomer having at least one cationically polymerizable functional group;
(a3) 5 to 30 wt % of at least one alkoxysilane-modified (meth)acrylic ester;
(a4) optionally 5 to 30 wt % of at least one N-vinyl-substituted lactam; and
(a5) optionally up to 5 wt % of at least one (meth)acrylic ester different from (a1) and/or of at least one olefinically unsaturated monomer which is copolymerizable with components (a1) to (a4).

The weight figures are based in each case on the composition. The invention further relates to a pressure sensitive adhesive, and also to a structural pressure sensitive adhesive, which are obtainable by polymerizing the components of the composition of the invention.

The foundation for the present invention is the finding that through the combination of component (a2) with the alkoxysilane-modified (meth)acrylic ester of component (a3), an improvement in adhesion to damp surfaces is achieved in PSAs and structural PSAs produced from this combination, without occurrence of the disadvantages known from the prior art affecting the cohesion in the noncrosslinked state. This advantage is particularly pronounced when component (a2) contains epoxide groups and/or oxetane groups, more particularly a 3,4-epoxycyclohexyl group.

In the text below, the term "cationically polymerizable functional groups or monomers" refers to all epoxide (oxirane) and/or oxetane groups, or molecules comprising at least one of these functional groups, more particularly 3,4-epoxycyclohexyl groups.

A polyacrylate below is a polymer comprising monomers from the series of the acrylic and/or methacrylic esters. Here, the term "(meth)acrylic esters" refers in the sense of the present invention to a compound of the formula (I) wherein $R^1$ is a hydrogen atom and/or a methyl group.

Chemical linking or crosslinking of the two polymer networks means, in the context of this specification, a reaction between polymer macromolecules such that between these macromolecules an additional three-dimensional network is formed as well as the one which already exists. In the sense of the invention, this is achieved through the use of actinic (high-energy) radiation, such as ultraviolet rays, electron beams or radioactive rays, for instance. Initiating the crosslinking by means of thermal energy is undesirable, since otherwise the storage stability of the structural PSAs of the invention is not assured; however, following the activation of the cationic polymerization by actinic radiation, also leading simultaneously to the crosslinking of the epoxy matrix with the polyacrylate containing cationically polymerizable groups, it is possible to utilize the thermal energy in order to increase the efficiency of the crosslinking reaction and of the polymerization. An increase in efficiency may additionally be obtained by mechanical influence (such as ultrasound, for instance) or by exothermic reaction processes within the reaction system.

In the case of the present invention, a UV-activatable photoinitiator is preferably used. Following activation via high-energy radiation, such compounds release a proton, which triggers the cationic crosslinking reaction. Activation by means of actinic radiation, more particularly with the aid of UV radiation, may take place before or after application to the adherends. In the case of UV-transparent substrates, activation may also take place after application, in the adhesive bond.

Structural PSA formulations are understood in accordance with the invention to be mixtures and compositions which comprise at least crosslinkable (noncrosslinked and/or partially crosslinked and further-crosslinkable), pressure sensitively adhesive polyacrylates, optionally further polymers, and cationic polymerizable monomers; after polymerization and the simultaneous crosslinking of these preparations, the resulting crosslinked polymer systems are suitable as structural PSAs.

A pressure sensitive adhesive (PSA) is understood in this specification, as is customary within the general usage, as a substance which—in particular at room temperature—is permanently tacky and also adhesive (referred to in the context of this specification as "pressure sensitively adhesive" or else as "self-adhesive"). A characteristic of a PSA is that it can be applied by means of pressure to a substrate and remains adhering there. Depending on the precise nature of the PSA, the temperature and atmospheric humidity, and also the substrate, a minimal pressure of short duration, which does not go beyond gentle contact for a brief moment, may be sufficient to obtain the adhesion effect, while in other cases a longer-term period of exposure to a high pressure may be necessary. PSAs have particular, characteristic viscoelastic properties which result in the permanent tack and adhesiveness. A characteristic of these is that, when they are mechanically deformed, there are processes of viscous flow and there is also development of elastic forces of recovery. The two processes have a certain relationship to one another in terms of their respective proportion, in dependence not only on the precise composition, the structure, and the degree of crosslinking of the PSA in question, but also on the rate and duration of the deformation, and on the temperature.

The structural PSA obtained after curing, in contrast, attains very high peel resistance, which may be of orders of magnitude like that of a structural adhesive.

Before the curing, the structural PSA of the invention, like a conventional PSA, may be applied in the form of a single- or double-sided adhesive tape, an adhesive tape roll, an adhesive transfer tape, a diecut, and other embodiments familiar to the skilled person. The PSA may optionally also be provided with a carrier, such as a polymeric film or metal foil, for example. In the case of double-sided adhesive embodiments, this carrier is located internally. The invention also relates to embodiments wherein the PSA of the invention is located only on one side of the carrier, in which case the opposite flat side of the carrier may be coated with a different adhesive. For that purpose, all adhesives known per se to the skilled person are suitable.

Because of the balanced adhesive and cohesive properties, the structural PSA of the invention is suitable for the preliminary fixing of different adherends. During assembly, therefore, there are no instances of adhesive being squeezed out and possibly fouling the adherends or leading to optical defects.

The PSAs and structural PSAs of the invention are notable, moreover, for effective adhesion to damp substrates. This is an advantage given the fact that in industrial manufacturing operations, as for example in automaking, the components to be bonded are sometimes stored in outdoor areas or unheated warehouses. These components are generally bonded immediately after being supplied to the production process, without conditioning beforehand. Under these conditions, a film of moisture may be formed on the surface, and could adversely affect bonding with adhesives known to date. This can lead to quality fluctuations affecting the bond. The component (a3) present in the compositions of the invention here acts as a moisture scavenger built into the polymer of the PSA, allowing good bonding outcomes to be achieved even on damp substrates. Moreover, the silane groups of component (a3) act like an integrated adhesion promoter in the bonding context, especially on glass substrates.

The PSA may be configured in such a way that it can be cured by actinic radiation. In that case, the bond strengths achieved are of a similar order of magnitude as with structural adhesives. Moreover, the invention also relates to the production and products comprising the PSAs and structural PSAs of the invention, and also to their use.

DETAILED DESCRIPTION OF THE INVENTION

The present invention describes a composition for producing a PSA or structural PSA, comprising an epoxy-functionalized acrylate matrix, cationically polymerizable epoxy monomers, and also, if desired, a photoinitiator which releases a Brönsted acid or Lewis acid. The structural PSA surprisingly exhibits a synergy between the acrylate matrix and the epoxide matrix, owing to the simultaneous cross-linking via the epoxy groups of the polyacrylate matrix. This synergy is manifested in the fact that the structural adhesive has the pressure sensitively adhesive properties of the polyacrylate prior to exposure with UV or other actinic radiation, and has the structural strength of an epoxy adhesive following irradiation. By virtue of the silane groups incorporated by polymerization, which function as water scavengers on contact with moisture, the PSAs and structural PSAs of the invention display a high level of adhesion on damp surfaces. Since, therefore, the silane groups are not present in monomeric or oligomeric form, in the form of an admixed liquid, there is virtually no adverse effect on the cohesion of the PSA.

A further advantage of the cationic polymerization and also of the simultaneous crosslinking reaction is that following initiation, the reaction is also able to continue in the absence of light and therefore directly in the joint, and in contrast to a radical mechanism, this means that layer thicknesses even of up to 1 mm can be fully cured.

Polyacrylate Matrix

The composition of the invention for producing the PSAs and structural PSAs comprises or consists in accordance with the invention of (a1) 35 to 90 wt % of at least one (meth)acrylic ester of the general formula (I), (a2) 5 to 30 wt % of at least one olefinically unsaturated monomer having at least one cationically polymerizable functional group;

(a3) 5 to 30 wt % of at least one alkoxysilane-modified (meth)acrylic ester;

(a4) optionally 5 to 30 wt % of at least one N-vinyl-substituted lactam; and (a5) optionally up to 5 wt % of at least one (meth)acrylic ester different from (a1) and/or of at least one olefinically unsaturated monomer which is copolymerizable with components (a1) to (a4), the figures being based in each case on the composition.

In one preferred embodiment of the composition of the invention, it comprises or consists of components (a1) to (a4), meaning that component (a4), identified as being optional above, is present with a fraction of 5 to 30 wt %. This is especially advantageous because PSAs and structural PSAs produced from such a composition are distinguished by improved adhesion.

In a further preferred variant of the composition of the invention, it comprises or consists independently of one another of 45 to 80 wt %, especially 45 to 70 wt %, of component (a1), 10 to 25 wt %, especially 15 to 25 wt %, of component (a2), 10 to 25 wt %, especially 15 to 25 wt %, of component (a3), 10 to 25 wt %, especially 15 to 25 wt %, of component (a4).

The weight figures are based in each case on the composition. In other words, the aforementioned ranges may be combined with one another as desired.

Preferred for use for the monomers (a1) are acrylic monomers comprising acrylic and methacrylic esters with alkyl groups consisting of 1 to 14 carbons. Specific examples, without wishing to be restricted by this enumeration, are methyl (meth)acrylate, ethyl (meth)acrylate, propyl (meth)acrylate, n-butyl (meth)acrylate, n-pentyl (meth)acrylate, n-hexyl (meth)acrylate, n-heptyl acrylate, n-octyl acrylate, n-nonyl acrylate, lauryl acrylate, stearyl (meth)acrylate, behenyl acrylate, and their branched isomers, such as 2-ethylhexyl acrylate and 2-propylhexyl acrylate, for example. Other classes of compound for use, which may likewise be added in small amounts under (a1), are cyclohexyl (meth)acrylate and isobornyl (meth)acrylate.

Preferred for use for the monomers (a2) are monomers of the formula (II)

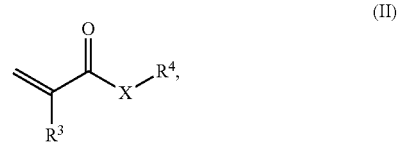

where $R^3$ is H or —$CH_3$, X is —$NR^5$— or —O—, $R^5$ being H or —$CH_3$, and $R^4$ is an epoxy-functionalized (hetero)hydrocarbyl group.

With further preference the group $R^4$ encompasses linear, branched, cyclic, or polycyclic hydrocarbons having 2 to 30 carbon atoms and being functionalized with an epoxy group. With particular preference the group $R^4$ encompasses 3 to 10 carbon atoms, such as glycidyl (meth)acrylate, for example. Even more particularly preferred are 3,4-epoxycyclohexyl-substituted monomers such as, for example, 3,4-epoxycyclohexylmethyl (meth)acrylate.

In a preferred embodiment of the composition of the invention, component (a3) is selected from 3-(triethoxysilyl) propyl methacrylate (CAS: 21142-29-0), 3-(triethoxysilyl) propyl acrylate (CAS: 20208-39-3), 3-(trimethoxysilyl)propyl acrylate (CAS: 4369-14-6), 3-(trimethoxysilyl)propyl methacrylate (CAS: 2530-85-0), methacryloyloxymethyltriethoxysilane (CAS: 5577-72-0), (methacryloyloxymethyl) trimethoxysilane (CAS: 54586-78-6), (3-acryloyloxypropyl)methyldimethoxysilane (CAS: 13732-00-8), (methacryloyloxymethyl)methyldimethoxysilane (CAS: 121177-93-3), γ-methacryloyloxypropylmethyldimethoxysilane (CAS: 3978-58-3), methacryloyloxypropylmethyldiethoxysilane (CAS: 65100-04-1), 3-(dimethoxymethylsilyl)propyl methacrylate (CAS: 14513-34-9), methyacryloyloxypropyldimethylethoxysilane (CAS: 13731-98-1), methacryloyloxypropyldimethylmethoxysilane (CAS: 66753-64-8). These compounds are particularly preferred since they can easily be incorporated into the polymer network of the PSA or structural PSA, do not lead to any significant reduction in cohesion in that case, but at the same time produce a considerable improvement in the adhesion to damp surfaces. Particularly preferred among the aforementioned compounds are 3-(triethoxysilyl)propyl methacrylate, 3-(triethoxysilyl)propyl acrylate, 3-(trimethoxysilyl)propyl acrylate, and 3-(trimethoxysilyl) propyl methacrylate.

Preferred for use as (a4) are N-vinyl lactams, particular preference being given to N-vinylpyrrolidone, N-vinylpiperidone, and N-vinylcaprolactam. Likewise encompassed inventively by the group (a4) are monomers such as N-vinylformamide, N-methyl-N-vinylacetamide, and N-vinylphthalimide.

The optional component (a5) preferably has a functional group which is thermally polymerizable but does not lead to any thermal cationic polymerization of the epoxide and/or oxetane groups of component (a2). This is particularly advantageous since in this way it is possible for the composition to undergo preliminary thermal crosslinking. The fact that at the same time there is no thermal cationic polymerization of the epoxide and/or oxetane groups of component (a2) is beneficial to the storage stability of the composition and of the PSAs produced from it.

Used with particular preference for the optional monomers (a5) are, for example, benzyl (meth)acrylate, phenyl (meth)acrylate, tert-butylphenyl (meth)acrylate, phenoxyethyl (meth)acrylate, 2-butoxyethyl (meth)acrylate, N,N-dimethylaminoethyl (meth)acrylate, N,N-diethylaminoethyl (meth)acrylate, tetrahydrofurfuryl acrylate, hydroxyethyl (meth)acrylate, 3-hydroxypropyl (meth)acrylate, 4-hydroxybutyl (meth)acrylate, 6-hydroxyhexyl (meth)acrylate, cyanoethyl (meth)acrylate, allyl alcohol, acrylamide, N-tert-butylacrylamide, N-methylol (meth)acrylamide, N-(butoxymethyl)methacrylamide, N-(ethoxymethyl)acrylamide, N-isopropylacrylamide, styrene, methylstyrene, and 3,4-dimethoxystyrene, this enumeration not being conclusive.

A further subject of the present invention is a method for producing a pressure sensitive adhesive by polymerizing a composition of the invention. During the polymerization or subsequently, in other words after polymerization has taken place, the composition may be subjected to a radiation-induced crosslinking reaction, especially to a UV-induced cationic polymerization.

The invention relates, further, to a pressure sensitive adhesive and also to a structural pressure sensitive adhesive, which are obtainable by a method of the invention. In the case of the structural pressure sensitive adhesive, there is also crosslinking of the cationically polymerizable groups, in other words, for example, of the epoxide groups and/or oxetane groups, as well as the polymerization of the acrylate monomers.

A further subject of the present invention relates to a sheetlike bonding element comprising or consisting of a pressure sensitive adhesive or structural pressure sensitive adhesive of the invention, the bonding element being selected especially from diecuts with or without carrier, and single-sided or double-sided, foamed or unfoamed tapes, tape sections, and adhesive transfer tapes coated on one or both sides with the pressure sensitive adhesive of the invention. The invention also relates to intermediates furnished with the aforementioned bonding element, especially with a double-sided bonding element.

The invention relates, moreover, to a hook, a decorative element, an interior automobile mirror, a stiffening profile, or an architectural facing element, wherein at least one surface bears an applied pressure sensitive adhesive or structural pressure sensitive adhesive of the invention and/or an applied sheetlike bonding element of the invention.

A subject of the invention is also a component made up of at least two structural elements, which are bonded to one another at least in sections with a pressure sensitive adhesive or structural pressure sensitive adhesive of the invention and/or with a sheetlike bonding element of the invention. This component may for example be an automotive component, such as a headlamp unit wherein the headlamp glass is bonded to the housing part.

The invention relates, furthermore, to a kit comprising a pressure sensitive adhesive or structural pressure sensitive adhesive of the invention and/or a sheetlike bonding element of the invention and also a separating means for the end-use processing of the pressure sensitive adhesive or of the sheetlike bonding element. In this way it is possible to offer a form of presentation in which the end user is able to perform the end-use processing directly before the application. The separating means may be, for example, a cutting means, combined if desired with an unwinding means.

The invention relates, lastly, to the use of an alkoxysilane-modified (meth)acrylic ester in (meth)acrylic ester-based pressure sensitive adhesives, especially for improving the adhesion thereof to damp surfaces, preferably to damp glass surfaces. Preferred alkoxysilane-modified (meth)acrylic esters used are those of the kind described as component (a3) for the composition of the invention.

For the polymerization the monomers are selected such that the resultant polymers can be used as PSAs, more particularly such that the resultant polymers possess adhesive properties in accordance with the "Handbook of Pressure Sensitive Adhesive Technology" by Donatas Satas (van Nostrand, New York 1989).

The glass transition temperature $T_g$ of the polyacrylate is a product of the nature and amount of the respective comonomers and is obtained arithmetically from the Fox equation (E1) (cf. T. G. Fox, Bull. *Am. Phys. Soc.* 1956, 1, 123).

$$\frac{1}{T_g} = \sum_n \frac{W_n}{T_{g,n}} \qquad (E1)$$

In this equation, n represents the serial number of the monomers used, $W_n$ the mass fraction of the respective monomer n (wt %), and $T_{g,n}$ the respective glass transition temperature of the homopolymer of the respective monomers n, in K.

The comonomers of a PSA are typically selected such that the glass transition temperature of the polymers is below the application temperature, preferably at $T_g \leq 15°$ C. In view of the possibility of using epoxide monomers which act as plasticizers in the noncrosslinked state, the resultant glass transition temperature of the polyacrylate matrix of the invention in the structural PSA may significantly exceed the glass transition temperatures typical of PSAs. Nevertheless, the comonomer composition of the polyacrylate matrix of the invention is selected such that the glass transition temperature $T_g \leq 40°$ C., preferably $T_g \leq 30°$ C.

For preparing the polyacrylate PSAs it is advantageous to carry out conventional radical polymerizations or control radical polymerizations. For the polymerizations which proceed by a radical mechanism it is preferred for initiator systems to be used that additionally comprise further radical initiators for the polymerization, more particularly thermally decomposing radical-forming azo or peroxo initiators. Suitability is possessed in principle, however, by all customary initiators that are familiar to the skilled person for acrylates and/or methacrylates. The production of C-centered radicals is described in Houben-Weyl, Methoden der Organischen Chemie, vol. E 19a, pp. 60-147. These methods are preferentially employed in analogy.

Examples of radical sources are peroxides, hydroperoxides, and azo compounds. As a number of nonexclusive examples of typical radical initiators, mention may be made here of potassium peroxodisulfate, dibenzoyl peroxide, cumene hydroperoxide, cyclohexanone peroxide, di-tert-butyl peroxide, azobisisobutyronitrile, cyclohexylsulfonyl acetyl peroxide, diisopropyl percarbonate, tert-butyl peroctoate, and benzopinacol. A particularly preferred radical initiator used is 2,2'-azobis(2-methylbutyronitrile) (Vazo 67™ from DuPont).

The number-average molecular weights Mn of the PSAs from the radical polymerization, i.e., before any possible radiation-induced crosslinking reaction, are very preferably selected so as to be in a range from 20 000 to 2 000 000 g/mol; production is preferably of PSAs having weight-average molecular weights Mw of 200 000 to 20 000 000 g/mol, more preferably of 1 000 000 to 15 000 000 g/mol. The average molecular weight is determined via gel permeation chromatography (GPC) against PMMA standards.

The average molecular weights (weight average $M_w$ and number average $M_n$) and the polydispersity D were determined by gel permeation chromatography (GPC). The eluent used was THF with 0.1 vol % of trifluoroacetic acid. Measurement took place at 25° C. The pre-column used was PSS-SDV, 5 μm, $10^3$ Å ($10^{-7}$ m), ID 8.0 mm×50 mm. Separation took place using the columns PSS-SDV, 5 μm, $10^3$ Å ($10^{-7}$ m), $10^5$ Å ($10^{-5}$ m) and $10^6$ Å ($10^{-4}$ m) each with ID 8.0 mm×300 mm. The sample concentration was 4 g/L, the flow rate 1.0 mL per minute. Measurement was made against PMMA standards.

The polymerization may be carried out in bulk, in the presence of one or more organic solvents, in the presence of water, or in mixtures of organic solvents and water. The aim here is to minimize the amount of solvent used. Suitable organic solvents are pure alkanes (e.g., hexane, heptane, octane, isooctane), aromatic hydrocarbons (e.g., benzene, toluene, xylene), esters (e.g., ethyl acetate, propyl, butyl or hexyl acetate), halogenated hydrocarbons (e.g., chlorobenzene), alkanols (e.g., methanol, ethanol, ethylene glycol, ethylene glycol monomethyl ether), ketones (e.g., acetone, butanone), and ethers (e.g., diethyl ether, dibutyl ether), or mixtures thereof.

The aqueous polymerization reactions may be admixed with a water-miscible or hydrophilic cosolvent, in order to ensure that the reaction mixture is in the form of a homogeneous phase during monomer conversion. Cosolvents which can be used advantageously for the present invention are selected from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxyl ether derivatives, amino alcohols, ketones, and the like, and also derivatives and mixtures thereof.

The polymerization time is between 4 and 72 hours, depending on conversion and temperature. The higher the reaction temperature that can be selected, in other words the higher the thermal stability of the reaction mixture, the lower the level at which it is possible to select the reaction time.

To initiate the polymerization, the introduction of heat is essential for the thermally decomposing initiators. For the thermally decomposing initiators, the polymerization can be initiated by heating to 50 to 160° C., according to initiator type.

In a favorable procedure, nitroxides are used for radical stabilization, such as, for example, (2,2,5,5-tetramethyl-1-pyrrolidinyl)oxyl (PROXYL), (2,2,6,6-tetramethyl-1-piperidinyl)oxyl (TEMPO), derivatives of PROXYL or of TEMPO, and other nitroxides familiar to the skilled person.

A series of further polymerization methods according to which the adhesives may be prepared in an alternative procedure can be selected from the prior art: WO 96/24620 A1 describes a polymerization process which uses very specific radical compounds such as, for example, phosphorus-containing nitroxides based on imidazolidine. WO 98/44008 A1 discloses specific nitroxyls which are based on morpholines, piperazinones, and piperazinediones. DE 199 49 352 A1 describes heterocyclic alkoxyamines as regulators in controlled radical polymerizations.

As a further controlled polymerization method it is possible advantageously, for the synthesis of block copolymers, to use Atom Transfer Radical Polymerization (ATRP), in which case the initiator used preferably comprises monofunctional or difunctional secondary or tertiary halides and, for abstracting the halide or halides, complexes of Cu, of Ni, of Fe, of Pd, of Pt, of Ru, of Os, of Rh, of Co, of Ir, of Ag or of Au. The various possibilities of ATRP are described further in the specifications of U.S. Pat. Nos. 5,945,491 A, 5,854,364 A, and 5,789,487 A.

As a very preferred production process, a variant of the RAFT polymerization (reversible addition-fragmentation chain transfer polymerization) is carried out. The polymerization process is described comprehensively in the specifications WO 98/01478 A1 and WO 99/31144 A1, for example. Particularly advantageously suitable for the preparation are trithiocarbonates of the general structure R'''—S—C(S)—S—R''' (*Macromolecules* 2000, 33, 243-245).

In a very advantageous variant, the polymerization is carried out using, for example, the trithiocarbonates (TTC1) and (TTC2) or the thio compounds (THI1) and (THI2), where Φ may be a phenyl ring, which may be unfunctionalized or functionalized with alkyl or aryl substituents linked directly or via ester or ether bridges; a cyano group; or a saturated or unsaturated aliphatic radical. The phenyl ring Φ may optionally carry one or more polymer blocks, as for example polybutadiene, polyisoprene, polychloroprene or poly(meth)acrylate, which may have a construction in line with the definition for P(A) or P(B), or polystyrene, to name but a few. Examples of possible functionalizations include halogens, hydroxyl groups, epoxide groups, nitrogen-containing or sulfur-containing groups, without this recitation making any claim to completeness.

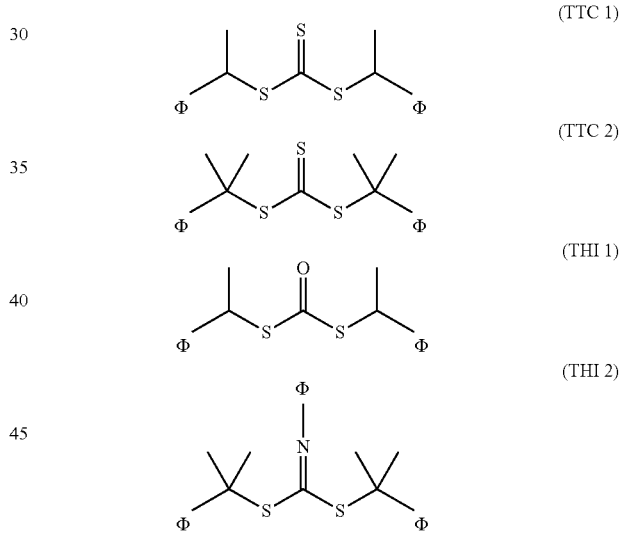

In conjunction with the aforementioned controlled radical polymerizations, initiator systems are preferred which additionally contain further radical initiators for the polymerization, more particularly the thermally decomposing radical-forming azo or peroxo initiators already enumerated above. In principle, however, all customary initiators known for acrylates and/or methacrylates are suitable for this purpose. It is also possible, moreover, to use radical sources which release radicals only under UV irradiation.

Cationically Polymerizable Monomers

The cationically polymerizable monomers have at least one polymerizable functional group and include cyclic ethers such as, for example, epoxides (oxiranes, 1,2-epoxide), 1,3-(oxetanes) and 1,4-cyclic ethers (1,3- and 1,4-epoxides), and also alkyl vinyl ethers, styrene, p-methylstyrene, divinylbenzene, N-vinyl-substituted compounds, 1-alkylolefins (α-olefins), lactams, and cyclic acetals. Preference is given to epoxides and oxetanes, particular preference to 3,4-epoxycyclohexyl-functionalized monomers.

Additionally, the cationically polymerizable epoxides of the invention may be present as monomers or polymers, and have on average a molecular weight or a mean molecular weight of 58 g/mol to about 1000 g/mol. The epoxides may be aliphatic, cycloaliphatic, aromatic, or heterocyclic. The number of epoxy functionalities per molecule is preferably one to six, more preferably one to three. Preferred cationically polymerizable monomers are aliphatic, cycloaliphatic epoxides and glycidyl ethers, such as propylene oxide, epichlorohydrin, styrene oxide, vinylcyclohexene oxide, cyclohexene oxide, vinylcyclohexene dioxide, glycidol, butadiene oxide, glycidyl methacrylate, bisphenol A diglycidyl ether (e.g., Epon 828, Epon 825, Epon 1004, Epon 1001, Momentive Speciality Chemicals), dicyclopentadiene dioxide, epoxidized polybutadienes (e.g., Oxiron 2001, FMC Corp.), 1,4-butanediol diglycidyl ether, 1,2-cyclohexanedicarboxylic diglycidyl ester, polyglycidyl ethers of phenolic resins based on resole or novolacs (e.g., DEN 431, DEN 438, Dow Chemical), resorcinol diglycidyl ether, and epoxidized silicones such as, for example, dimethylsiloxanes with glycidyl ether groups or epoxycyclohexane groups.

Particularly preferred are 3,4-epoxycyclohexyl-functionalized monomers, such as, for example, 3,4-epoxycyclohexylmethyl acrylate, 3,4-epoxycyclohexylmethyl methacrylate, 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, bis(3,4-epoxy-6-methylcyclohexylmethyl) adipate, 1,4-cyclohexanedimethanol bis(3,4-epoxycyclohexanecarboxylate), and also 3,4-epoxycyclohexylmethyl 3',4'-epoxycyclohexanecarboxylate-modified ε-caprolactones (CAS No. 139198-19-9 (Celloxide 2081, from Daicel, Japan) and 151629-49-1 (Tetrachem, from Hainan Zhongxin Chemical, China)).

Likewise inventive are mixtures of the aforementioned and also all further cationically polymerizable monomers familiar to the skilled person. Advantageous mixtures comprise two or more epoxides, wherein the epoxides may have different molecular weights and may be grouped into those having a low molecular weight (M<200 g/mol), having a medium molecular weight range (200 g/mol<M<1000 g/mol), and having a high molecular weight (M>1000 g/mol). It may also be of advantage to use mixtures of epoxides having different numbers of epoxy groups. Optionally it is possible for further cationically polymerizable monomers to be admixed.

The concentration of the epoxide monomer or of the epoxide monomer mixture, respectively, is advantageously selected so as to result in an epoxide concentration of 0.001 mmol epoxide/g polymer to 4 mmol epoxide/g polymer, preferably 0.01 mmol epoxide/g polymer to 2.5 mmol epoxide/g polymer.

Cationic Photoinitiators

According to one preferred embodiment of the composition of the invention, it comprises at least one cationic photoinitiator. The cationic photoinitiator fragments by means of actinic radiation, preferably UV radiation, with one or more of these fragments being a Lewis or Brönsted acid, which catalyzes the cationic polymerization and also the concurrent crosslinking of the polyacrylate matrix with the epoxy matrix that forms. Advantageous photoinitiators are thermally stable, do not cause polymerization of the monomers, not even by thermal activation, and are both insoluble in the uncured and soluble in the cured structural PSA formulation. It is further of advantage for the acids liberated by fragmentation of the photoinitiator to have a pKa<0.

The photoinitiators are ionic compounds, with the cations being based preferably on organic onium structures, more particularly on salts having aliphatic and aromatic group IVA to VIIA (CAS nomenclature)-centered onium cations, more preferably on I-, S-, P-, Se-, N-, and C-centered onium salts, selected from the group of the sulfoxonium, iodonium, sulfonium, selenonium, pyridinium, carbonium, and phosphonium salts, even more preferably on the I- and S-centered onium salts, such as, for example, sulfoxonium, diaryliodonium, triarylsulfonium, diarylalkylsulfonium, dialkylarylsulfonium, and trialkylsulfonium salts.

The nature of the anion in the photoinitiator may influence the reaction rate and also the conversion of the cationic polymerization. For example, J. V. Crivello and R. Narayan in *Chem. Mater.* 1992, 4, 692 describe a reactivity sequence of common counterions as follows: $SbF_6^->AsF_6^->PF_6^->BF_4^-$. The reactivity of the anion here is dependent on the following factors (1) the acidity of the Lewis or Brönsted acid liberated, (2) the degree of ion pair separation in the growing cationic chain, and (3) the susceptibility of the anion to fluoride abstraction and chain termination. Another anion that can be used is $B(C_6F_5)_4^-$.

Advantageous photoinitiators include bis(4-tert-butylphenyl)iodonium hexafluoroantimonate (FP5034™ from Hampford Research Inc.), a mixture of triarylsulfonium salts (diphenyl(4-phenylthio)phenylsulfonium hexafluoroantimonate and bis(4-diphenyl-sulfonio)phenyl)sulfide hexafluoroantimonate) available as Syna PI-6976™ from Synasia, (4-methoxyphenyl)phenyliodonium triflate, bis(4-tert-butylphenyl)iodonium camphorsulfonate, bis(4-tert-butylphenyl) iodonium hexafluoroantimonate, bis(4-tert-butylphenyl)iodonium hexafluorophosphate, bis(4-tert-butylphenyl)iodonium tetrafluoroborate, bis(4-tert-butylphenyl)iodonium triflate, [4-(octyloxy)phenyl]phenyliodonium hexafluorophosphate, [4-(octyloxy)phenyl]phenyliodonium hexafluoroantimonate, bis(4-methylphenyl)iodonium hexafluorophosphate (available as Omnicat 440™ from IGM Resins), 4-[(2-hydroxy-1-tetradecyloxy)phenyl]phenyliodonium hexafluoroantimonate, triphenylsulfonium hexafluoroantimonate (available as CT-548™ from Chitec Technology Corp.), diphenyl(4-phenylthio)phenylsulfonium hexafluorophosphate, diphenyl(4-phenylthio)phenylsulfonium hexafluoroantimonate, bis(4-(diphenylsulfonio)phenyl)sulfide hexafluoroantimonate, in an enumeration which should not be understood as being conclusive.

The concentration of the photoinitiator is selected so as to achieve the desired degree of crosslinking and degree of polymerization, which in turn may vary on account of different layer thicknesses of the structural PSA and of the desired adhesive properties. Additionally, the required photoinitiator concentration is dependent on the quantum yield (the number of acid molecules released per proton absorbed) of the initiator, the pKa of the acid, the permeability of the polymer matrix, the wavelength and duration of the irradiation, and the temperature. Generally speaking, concentrations of 0.01 to 2 parts by weight, more particularly 0.1 to 1.5 parts by weight, are preferred, based on 100 parts by weight of the polyacrylate and of the cationically polymerizable monomers.

Likewise in accordance with the invention, moreover, is the use of photosensitizers or photoaccelerators in combination with the photoinitiators. Photosensitizers and photoaccelerators modify or improve the wavelength sensitivity of the photoinitiator, respectively. This is especially advantageous if the absorption of the incident light by the initiator is insufficient. The use of photosensitizers and photoaccelerators raises the sensitivity for electromagnetic radiation, especially actinic radiation, and thus allows irradiation times to be shorter and/or the radiation sources utilized to have a lower output. Photosensitizers and photoaccelerators may be exemplified by pyrene, fluoranthene, xanthone, thioxanthone, benzophenone, acetophenone, benzyl, benzoin and benzoin ethers, chrysene, p-terphenyl, acenaphthene, naphthalene, phenanthrene, biphenyl, and also substituted derivatives of the aforementioned compounds. Where required, the amount of photosensitizer or photoaccelerator is less than 10 wt %, preferably less than 1 wt %, based on the amount of the photoinitiator.

The structural PSA may additionally comprise further additives as well, with preference being given to tackifier resins, plasticizers, dyes, aging inhibitors, solid or hollow glass spheres, silica, silicates, nucleating agents, expandants. The additives may be used provided they do not adversely impact the properties and the curing mechanism of the structural PSA. The optional tackifier resins are used advantageously in amounts of up to 50 wt %, preferably up to 40 wt %, more preferably still up to 30 wt %, based on the polymer. Customarily it is possible to use rosin esters, terpene-phenolic resins, hydrocarbon resins, and indene-coumarone resins. Through the nature and amount of the tackifier resin it is possible to influence the wetting, the peel adhesion, the bonding to substances of different polarity, the heat stability, and the tack.

Likewise in the sense of the invention it is possible for the structural PSAs to be crosslinked chemically even prior to the UV activation, in order to increase the internal strength (cohesion). Preferred crosslinkers used are metal chelates, polyfunctional isocyanates, polyfunctional epoxides, polyfunctional aziridines, polyfunctional oxazolines, or polyfunctional carbodiimides.

The structural PSAs of the invention, described above, are outstandingly suitable for producing single-sided or double-sided adhesive tapes, in which case all carrier materials familiar to the skilled person may be used. By way of example, but without limitation, it is possible to employ PET, PVC, and PP films, paper, nonwovens, woven fabrics, and foams as carrier materials.

Structural pressure sensitive adhesive tape products of the invention, consisting of the above-described structural PSA formulations of the invention, include the following:
 (foamed and unfoamed) adhesive transfer tapes (double-sided adhesive tapes without a carrier)
 single-sided adhesive tapes
 double-sided adhesive tapes comprising at least one outer layer consisting of the structural PSA formulations of the invention.

Furthermore, for the processing and for the anchorage of the structural PSA layer with other possible layers, with a film based on polyester, polyamide, polymethacrylate, PVC, etc., or with a viscoelastic foamed or unfoamed carrier based on polyacrylate or polyurethane, it may be of advantage if chemical anchorage takes place, by way of a primer, for example.

For transport, storage, or diecutting, the adhesive tape is preferably provided on at least one side with a liner, this liner being, for example, a silicone-coated film or a silicone paper.

A further advantageous embodiment of the invention is the use of a carrier-free adhesive for the self-adhesive tape. A carrier-free adhesive is an adhesive which has no permanent carrier, such as a polymer film or a nonwoven. Instead, in a preferred embodiment, the self-adhesive composition is applied merely to a liner, in other words to a material which serves only temporarily for the support and greater ease of application of the self-adhesive composition. After the self-adhesive composition has been applied to the substrate surface, the liner is then removed, meaning that the liner is not a productive component.

The PSAs of the invention can be produced from solution and also from the melt. For the latter case, suitable production procedures include both batch methods and continuous methods. Particularly preferred is the continuous manufacture by means of an extruder with subsequent coating directly on a liner with or without a layer of adhesive.

In the text below, the invention is illustrated in more detail using examples, without thereby imposing any restrictions on the invention.

Experimental Section

Unless otherwise evident or indicated in each specific case, sample preparation and the measurements take place under standard conditions (25° C., 101 325 Pa).

I. Molecular Weights

The average molecular weights (weight average $M_w$ and number average $M_n$) and the polydispersity D were determined by gel permeation chromatography (GPC). The eluent used was THF with 0.1 vol % of trifluoroacetic acid. Measurement took place at 25° C. The pre-column used was PSS-SDV, 5 μm, $10^3$ Å ($10^{-7}$ m), ID 8.0 mm×50 mm. Separation took place using the columns PSS-SDV, 5 μm, $10^3$ Å ($10^{-7}$ m), $10^5$ Å ($10^{-5}$ m) and $10^6$ Å ($10^{-4}$ m) each with ID 8.0 mm×300 mm. The sample concentration was 4 g/L, the flow rate 1.0 mL per minute. Measurement was made against PMMA standards.

II. Solids Content:

The solids content is a measure of the fraction of unevaporable constituents in a polymer solution. It is determined gravimetrically by weighing the solution then evaporating the evaporatable fractions in a drying cabinet at 120° C. for 2 hours and reweighing the residue.

III. K Value (According to Fikentscher):

The K value is a measure of the average molecular size of high-polymer compounds. For the purpose of the measurement, one percent strength (1 g/100 ml) toluenic polymer solutions are prepared and their kinematic viscosities are determined by means of a Vogel-Ossag viscometer. Following standardization to the viscosity of the toluene, the relative viscosity is obtained, from which the K value can be computed by the method of Fikentscher (*Polymer* 1967, 8, 381 ff).

IV. Quantitative Determination of Shear Strength: Static Shear Test HP

A rectangular test specimen measuring 13 mm×20 mm of the double-sided adhesive tape under test is bonded between two steel plaques (50 mm×25 mm×2 mm; material as per DIN EN 10088-2, type 1, 4301, surface quality 2R, cold-rolled and bright-annealed, Ra=25-75 nm) in such a way that the bond area of the test specimen with both steel plaques is 260 mm²; the steel plaques are oriented in parallel with an offset in the longitudinal direction, and so the test specimen is bonded centrally between them and the steel plaques protrude beyond the test specimen on different sides. The bonded assembly is then pressed for 1 minute with an applied pressure of 100 N/cm². After a specified time for the bond to take (72 hours at room temperature, unless otherwise stated), the test elements prepared in this way are suspended, by one steel plaque region protruding beyond the test specimen, on a shear test measurement area, in such a way that the longitudinal direction of the steel plaques points downward, and the region of the other steel plaque that protrudes beyond the test specimen is loaded, at a specified temperature, with a selected weight (measurements at room temperature and with 20 N load and also at 70° C. and with 10 N load; see details in the respective table). Test conditions: standard conditions, 50% relative humidity.

An automatic clock then determines the time elapsing until failure of the test specimens, in minutes (the steel plaque under load drops off).

V. Peel Strength (Peel Adhesion) PA

A strip of the (pressure sensitive) adhesive tape under investigation is bonded in a defined width (standard: 20 mm) to the respective test substrate (in the case of steel, the substrate is of stainless steel 302 according to ASTM A 666; 50 mm×125 mm×1.1 mm; bright annealed surface; surface roughness Ra=50±25 nm average arithmetic deviation from the baseline) by being rolled down ten times with a 5 kg steel roller. Double-sided adhesive tapes are reinforced on the reverse with an unplasticized PVC film 36 µm thick. Identical samples are produced and are alternatively provided for immediate measurement, stored for 3 days and then measured, or stored for 14 days and then measured.

The prepared plate is clamped (fixed) into the testing apparatus, and the adhesive strip is peeled from the plate via its free end in a tensile testing machine at a peel angle of 90° and at a speed of 300 mm/min in the longitudinal direction of the adhesive tape. The force necessary for performing this operation is recorded. The results of the measurements are reported in N/cm (force standardized to the particular distance of bond parted) and are averaged over three measurements. All of the measurements are carried out in a conditioned chamber at 23° C. and 50% relative humidity.

VI. Microshear Test

This test serves for the accelerated testing of the shear strength of adhesive tapes under temperature load.

Sample Preparation for Microshear Test:

An adhesive tape (length about 50 mm, width 10 mm) cut from the respective sample specimen is bonded to a steel test plate, cleaned with acetone, so that the steel plate protrudes beyond the adhesive tape to the right and left, and so that the adhesive tape protrudes beyond the test plate by 2 mm at the top edge. The bond area of the sample in terms of height·width=13 mm·10 mm. The bond site is subsequently rolled down six times with a 2 kg steel roller at a speed of 10 m/min. The adhesive tape is reinforced flush with a stable adhesive strip which serves as a support for the travel sensor. The sample is suspended vertically by means of the test plate.

Microshear Test:

The sample specimen under measurement is loaded at the bottom end with a 100 g weight. The test temperature is 40° C., the test time 30 minutes (15 minutes of loading and 15 minutes of unloading). The shear travel after the specified test duration at constant temperature is reported as the result, in µm, as both the maximum value ["max"; maximum shear travel as a result of 15-minute loading]; and the minimum value ["min"; shear travel ("residual deflection") 15 minutes after unloading; on unloading there is a backward movement as a result of relaxation]. Likewise reported is the elastic component in percent ["elast"; elastic component=(max−min)·100/max].

VII. Dynamic Shear Strength:

A square of adhesive transfer tape with an edge length of 25 mm is bonded between two steel plates with overlap and the bond is pressed down at 0.9 kN (force P) for 1 minute. Following storage for 24 hours, the assembly is parted in a tensile testing machine from Zwick, at 50 mm/min and at 23° C. and 50% relative humidity, in such a way that the two steel plates are pulled apart at an angle of 180°. The maximum force is ascertained, in N/cm$^2$.

VIII Probe Tack Test:

The probe tack is measured according to ASTM D2979-01. A steel test plate is cleaned with acetone and then conditioned at room temperature for 30 minutes. After that the sample is bonded in the form of a transfer tape, without bubbles and in a defined manner, to the plate, by rolling down three times with a 2 kg roller at a speed of 150 mm/s. To cause the adhesive strip to develop adhesion to the substrate, the plate is stored in a controlled-climate chamber at 23° C. and 50% relative humidity for 12 hours. During this time, the surface for measurement must be lined, with a release paper, for example. The tack die (cylindrical form, diameter 6 mm, stainless steel) used to perform the measurement is cleaned with acetone and conditioned at room temperature for 30 minutes. The release paper is not removed from the adhesive strip until immediately before the measurement. Prior to measurement using the Texture Analyser TA.XT plus (Stable Micro Systems, Ltd.), the force, with a 2 kg weight, and the measuring distance are calibrated. A total of 5 to 10 individual measurements are carried out per sample, and the average is formed in each case.

Parameters: Preliminary speed: 1 mm/s, testing speed: 0.01 mm/s, trigger force: 0.005 N, removal speed: 10 mm/s, contact time: 1 s, pressing force: 0.27 N.

For evaluating the specimens, only the maximum force at the first force peak is reported below.

TABLE 1

| Raw materials used: | | | |
|---|---|---|---|
| Chemical compound | Trade name | Manufacturer | CAS No. |
| Bis(4-tert-butylcyclohexyl) peroxydicarbonate | Perkadox ® 16 | Akzo Nobel | 15520-11-3 |
| 2,2'-Azobis(2-methylbutyronitrile) | Vazo ® 67 | DuPont | 13472-08-7 |
| 3,4-Epoxycyclohexylmethyl methacrylate | S-100 | Synasia | 82428-30-6 |
| 3-Methacryloyloxypropyl-trimethoxysilane | Dynasylan ® MEMO | Evonik | 2530-85-0 |
| 3-Methacryloyloxypropylmethyl-diethoxysilane | KBE-502 | Shin-Etsu | 65100-04-1 |
| 3-Glycidyloxypropyltriethoxysilane | Dynasylan ® GLYEO | Evonik | 2602-34-8 |

TABLE 1-continued

Raw materials used:

| Chemical compound | Trade name | Manufacturer | CAS No. |
| --- | --- | --- | --- |
| Silane-terminated polyether | MS Polymer™ S303H | Kaneka | 75009-88-0 |
| (3,4-Epoxycyclohexane)methyl 3,4-epoxycyclohexylcarboxylate | Uvacure 1500 | Cytec | 2386-87-0 |
| Triarylsulfonium hexafluoroantimonate | | via Sigma-Aldrich | — |

Preparation of Base Polymer Ac1.

A reactor conventional for radical polymerizations was charged with 30.0 kg of 2-ethylhexyl acrylate, 30.0 kg of butyl acrylate, 5.0 kg of 3,4-epoxycyclohexylmethyl methacrylate, 10.0 kg of 3-methacryloyloxypropyltrimethoxysilane, 25.0 kg of N-vinylcaprolactam, and 66.7 kg of acetone/isopropanol (96:4). After nitrogen gas had been passed through the reactor for 45 minutes with stirring, the reactor was heated up to 58° C. and 50 g of Vazo 67 in solution in 500 g of acetone were added. The external heating bath was subsequently heated to 70° C. and the reaction was carried out constantly at this external temperature. After 1 hour a further 50 g of Vazo 67 in solution in 500 g of acetone were added, and after 2 hours the batch was diluted with 10 kg of acetone/isopropanol mixture (96:4). After 5.5 hours, 150 g of Perkadox 16 in solution in 500 g of acetone were added; after 6 hours 30 minutes, the batch was again diluted with 10 kg of acetone/isopropanol mixture (96:4). After 7 hours, a further 150 g of Perkadox 16 in solution in 500 g of acetone were added, and the heating bath was set to a temperature of 60° C.

After a reaction time of 22 hours, the polymerization was discontinued and the batch was cooled to room temperature. The product had a solids content of 50.1% and was dried. The resulting polyacrylate had a K value of 69.8, a weight-average molecular weight Mw of 10 275 000 g/mol and a number-average molecular weight Mn of 38 500 g/mol.

Preparation of Base Polymer Ac2

A reactor conventional for radical polymerizations was charged with 35.0 kg of 2-ethylhexyl acrylate, 20.0 kg of butyl acrylate, 10.0 kg of 3,4-epoxycyclohexylmethyl methacrylate, 20.0 kg of 3-methacryloyloxypropylmethyldiethoxysilane, 15.0 kg of N-vinylpyrrolidone, and 66.7 kg of acetone/isopropanol (96:4). After nitrogen gas had been passed through the reactor for 45 minutes with stirring, the reactor was heated up to 58° C. and 50 g of Vazo 67 in solution in 500 g of acetone were added. The external heating bath was subsequently heated to 75° C. and the reaction was carried out constantly at this external temperature. After 1 hour a further 50 g of Vazo 67 in solution in 500 g of acetone were added, and after 4 hours the batch was diluted with 12.1 kg of acetone/isopropanol mixture (96:4).

After 5 hours and again after 7 hours, initiation was repeated with 150 g of Perkadox 16 each time, in solution each time in 500 g of acetone. After a reaction time of 22 hours, the polymerization was discontinued and the batch was cooled to room temperature. The product had a solids content of 50.5% and was dried. The resulting polyacrylate had a K value of 68.5, a weight-average molecular weight Mw of 10 900 000 g/mol and a number-average molecular weight Mn of 20 100 g/mol.

Preparation of Base Polymer Ac3

A reactor conventional for radical polymerizations was charged with 30.0 kg of 2-ethylhexyl acrylate, 20.0 kg of butyl acrylate, 20.0 kg of 3,4-epoxycyclohexylmethyl methacrylate, 10.0 kg of 3-methacryloyloxypropylmethyldiethoxysilane, 20.0 kg of N-vinylpyrrolidone, and 66.7 kg of acetone/isopropanol (96:4). After nitrogen gas had been passed through the reactor for 45 minutes with stirring, the reactor was heated up to 58° C. and 50 g of Vazo 67 in solution in 500 g of acetone were added. The external heating bath was subsequently heated to 75° C. and the reaction was carried out constantly at this external temperature.

After 1 hour a further 50 g of Vazo 67 in solution in 500 g of acetone were added, and after 4 hours the batch was diluted with 12.1 kg of acetone/isopropanol mixture (96:4).

After a reaction time of 22 hours, the polymerization was discontinued and the batch was cooled to room temperature. The product had a solids content of 50.1% and was dried. The resulting polyacrylate had a K value of 55.5, a weight-average molecular weight Mw of 1 900 000 g/mol and a number-average molecular weight Mn of 28 200 g/mol.

Preparation of Comparative Polymer CA4 (No Alkoxysilane-Modified (Meth)Acrylic Ester)

A reactor conventional for radical polymerizations was charged with 35.0 kg of 2-ethylhexyl acrylate, 35.0 kg of butyl acrylate, 5.0 kg of 3,4-epoxycyclohexylmethyl methacrylate, 25.0 kg of N-vinylcaprolactam, and 66.7 kg of acetone/isopropanol (96:4). After nitrogen gas had been passed through the reactor for 45 minutes with stirring, the reactor was heated up to 58° C. and 50 g of Vazo 67 in solution in 500 g of acetone were added. The external heating bath was subsequently heated to 70° C. and the reaction was carried out constantly at this external temperature. After 1 hour a further 50 g of Vazo 67 in solution in 500 g of acetone were added, and after 2 hours the batch was diluted with 10 kg of acetone/isopropanol mixture (96:4). After 5.5 hours, 150 g of Perkadox 16 in solution in 500 g of acetone were added; after 6 hours 30 minutes, the batch was again diluted with 10 kg of acetone/isopropanol mixture (96:4). After 7 hours, a further 150 g of Perkadox 16 in solution in 500 g of acetone were added, and the heating bath was set to a temperature of 60° C.

After a reaction time of 22 hours, the polymerization was discontinued and the batch was cooled to room temperature. The product had a solids content of 50.2% and was dried. The resulting polyacrylate had a K value of 70.0, a weight-average molecular weight Mw of 11 050 000 g/mol and a number-average molecular weight Mn of 35 700 g/mol.

Preparation of Comparative Polymer CA5 (without N-Vinyl Lactam)

A reactor conventional for radical polymerizations was charged with 40.0 kg of 2-ethylhexyl acrylate, 40.0 kg of butyl acrylate, 10.0 kg of 3,4-epoxycyclohexylmethyl methacrylate, 10.0 kg of 3-methacryloyloxypropyltrimethoxysilane, and 66.7 kg of acetone/isopropanol (96:4). After nitrogen gas had been passed through the reactor for 45 minutes with stirring, the reactor was heated up to 58° C. and 50 g of Vazo 67 in solution in 500 g of acetone were added. The external heating bath was subsequently heated to 70° C. and the reaction was carried out constantly at this external temperature. After 1 hour a further 50 g of Vazo 67 in solution in 500 g of acetone were added, and after 2 hours the batch was diluted with 10 kg of acetone/isopropanol mixture (96:4). After 5.5 hours, 150 g of Perkadox 16 in solution in 500 g of acetone were added; after 6 hours 30 minutes, the batch was again diluted with 10 kg of acetone/isopropanol mixture (96:4). After 7 hours, a further 150 g of Perkadox 16 in solution in 500 g of acetone were added, and the heating bath was set to a temperature of 60° C.

After a reaction time of 22 hours, the polymerization was discontinued and the batch was cooled to room temperature. The product had a solids content of 50.8% and was dried. The resulting polyacrylate had a K value of 56.6, a weight-average molecular weight Mw of 1 420 000 g/mol and a number-average molecular weight Mn of 15 000 g/mol.

Examples

Production of Pressure Sensitive Adhesives PSA1 to PSA9 and of Comparative Adhesives CPSA10 to CPSA21.

TABLE 2

Adhesive-specific details

| Name | Base polymer | Epoxy monomer/ concentration [phr] | Sinale additive/ concentration [phr] |
|---|---|---|---|
| PSA1 | Ac1 | — | — |
| PSA2 | Ac1 | Uvacure 1500 (2.5) | — |
| PSA3 | Ac1 | Uvacure 1500 (5) | — |
| PSA4 | Ac2 | — | — |
| PSA5 | Ac2 | Uvacure 1500 (2.5) | — |
| PSA6 | Ac2 | Uvacure 1500 (5) | — |
| PSA7 | Ac3 | — | — |
| PSA8 | Ac3 | Uvacure 1500 (2.5) | — |
| PSA9 | Ac3 | Uvacure 1500 (5) | — |
| CPSA10 | CA4 | — | — |
| CPSA11 | CA4 | Uvacure 1500 (2.5) | — |
| CPSA12 | CA4 | — | GLYEO (10) |
| CPSA13 | CA4 | Uvacure 1500 (2.5) | GLYEO (10) |
| CPSA14 | CA4 | — | S303H (10) |
| CPSA15 | CA4 | Uvacure 1500 (2.5) | S303H (10) |
| CPSA16 | CA5 | — | — |
| CPSA17 | CA5 | Uvacure 1500 (2.5) | — |
| CPSA18 | CA5 | — | GLYEO (10) |
| CPSA19 | CA5 | Uvacure 1500 (2.5) | GLYEO (10) |
| CPSA20 | Ac1 | — | GLYEO (10) |
| CPSA21 | Ac1 | — | S303H (10) |

The initiator was always added in the dark and in solution in acetone to the adhesive formulation, which was subsequently mixed thoroughly with vigorous stirring. The examples below each contain 1.35 wt % of triarylsulfonium hexafluoroantimonate, based on the polymer.

The prepared formulation was diluted to a solids content of 30% with acetone and then coated from solution onto a siliconized release film (50 μm polyester) (coating speed 2.5 m/min, drying tunnel 15 m, temperatures zone 1: 40° C., zone 2: 70° C., zone 3: 95° C., zone 4: 105° C.). The coat weight in each case was 100 g/m². No difference was observed in terms of product properties between the drying at the above-stated temperatures or a much slower drying at room temperature.

TABLE 3

Technical adhesive results without UV irradiation

| Pressure sensitive adhesive | Peel adhesion steel [N/cm] | Peel adhesion glass [N/cm] | Peel adhesion wet glass [a] [N/cm] | Holding power [min] [b] |
|---|---|---|---|---|
| PSA1 | 4.6 | 2.1 | 1.9 | 1500 |
| PSA2 | 5.2 | 2.3 | 2.0 | 1200 |
| PSA3 | 5.3 | 2.2 | 1.9 | 1180 |
| PSA4 | 4.4 | 2.0 | 2.0 | 1450 |
| PSA5 | 5.6 | 2.2 | 2.1 | 1080 |
| PSA6 | 6.3 | 2.3 | 2.2 | 1020 |
| PSA7 | 5.2 | 2.8 | 2.7 | 1700 |
| PSA8 | 6.1 | 2.9 | 2.7 | 1560 |
| PSA9 | 6.5 | 2.9 | 2.8 | 1640 |
| CPSA10 | 5.2 | 0.8 | 0.2 | 1600 |
| CPSA11 | 6.6 | 0.9 | 0.2 | 1230 |
| CPSA12 | 6.9 | 2.2 | 1.1 | 150 |
| CPSA13 | 7.0 | 2.2 | 1.1 | <10 |
| CPSA14 | 6.2 | 1.9 | 0.9 | 220 |
| CPSA15 | 6.6 | 2.2 | 1.0 | 160 |
| CPSA16 | 4.8 | 0.6 | 0.2 | 600 |
| CPSA17 | 4.9 | 0.6 | 0.2 | 480 |
| CPSA18 | 5.2 | 1.9 | 1.1 | <10 |
| CPSA19 | 5.2 | 2.0 | 1.2 | <10 |
| CPSA20 | 5.2 | 2.5 | 2.4 | 780 |
| CPSA21 | 5.1 | 2.7 | 2.5 | 920 |

[a] The glass substrates were stored in deionized water at room temperature for 24 hours, only taken from the water bath shortly before measurement, conditioned in the air for 10 minutes and also bonded in the wet state.
[b] In the absence of any details regarding the fracture mode, the adhesive undergoes cohesive failure.

In order to assess the suitability of the specimens as PSAs, prior to the UV irradiation, the peel adhesion on steel, glass, and wet glass, and also the static holding power, were determined at room temperature. It is found that all of the structural PSAs of the invention, and the formulations with an epoxy monomer as well (PSA1 to PSA9), exhibit peel adhesions comparable with those of a typical acrylate PSA, and also exhibit good cohesion, the latter being achievable in spite of the absence of an additional chemical crosslinker. All of the comparative PSAs do show partially comparable peel adhesions on glass, but the peel adhesion on wet glass collapses drastically in the cases of CPSA10 to CPSA19. The use of epoxy monomers in the case of the comparative PSA results generally in somewhat higher peel adhesions on glass, and in a significant reduction in the cohesion (CPSA11 and CPSA17). The same is true of silane additives which are not bonded to the polymer backbone (CPSA12 to CPSA15 and also CPSA18 to CPSA19). In comparative examples CPSA20 and CPSA21, the inventive polymer Ac1 is likewise mixed with silanes. The peel adhesions are comparable with those of the inventive examples, but again there is a much lower cohesion, and so in these cases a preliminary fixing of the components to be bonded is not ensured, and/or the bond would fail without fixing following UV activation until the attainment of the maximum degree of crosslinking, because of the lack of cohesion.

UV Crosslinking of Structural Pressure Sensitive Adhesives PSA1 to PSA9 and of Comparative Adhesives CPSA1.0 to CPSA21

The adhesive tape specimens produced before, with a thickness of 100 μm, were each applied without bubbles to a steel plate and to a wet glass plate, respectively. By regulating the lamp power and the speed of travel of the conveyor belt, it was possible to vary the dose, with the optimum dose amounting in each case to 80 mJ/cm². Following irradiation of the open side, a further steel plate or wet glass plate, respectively, was adhered to the previously irradiated surface, in accordance with measurement method VII, within 30 seconds. When the time between UV irradiation and bonding was longer than five minutes, the surface had already undergone such severe crosslinking that the adhesion on the steel plate was no longer sufficient.

TABLE 4

Technical adhesive properties after UV crosslinking

| Pressure sensitive adhesive | Microshear test max [μm] | Microshear test elast. comp. [%] | Probe tack [N][c] | Dyn. shear strength steel [N/cm²][d] | Dyn. shear strength wet glass [N/cm²][a,d] |
|---|---|---|---|---|---|
| PSA1 | 57 | 57 | 2.5 | 120 | 75 |
| PSA2 | 79 | 72 | 2.3 | 141 | 81 |
| PSA3 | 79 | 75 | 2.2 | 132 (A) | 82 (A) |
| PSA4 | 58 | 63 | 2.7 | 132 | 99 |
| PSA5 | 45 | 88 | 2.7 | 156 | 120 |
| PSA6 | 39 | 98 | 1.8 | 110 (A) | 96 (A) |
| PSA7 | 74 | 68 | 2.2 | 128 | 81 |
| PSA8 | 66 | 78 | 1.3 | 135 | 95 |
| PSA9 | 62 | 85 | 1.3 | 142 | 96 |
| CPSA10 | 80 | 63 | 2.2 | 105 | 10 |
| CPSA11 | 65 | 85 | 1.9 | 115 | 8 |
| CPSA12 | 78 | 65 | 2.1 | 110 | 30 |
| CPSA13 | 62 | 79 | 1.8 | 112 | 51 |
| CPSA14 | 86 | 62 | 2.3 | 86 | 22 |
| CPSA15 | 77 | 80 | 1.9 | 99 | 26 |
| CPSA16 | 68 | 65 | 1.4 | 68 | 69 |
| CPSA17 | 58 | 84 | 1.2 | 52 (A) | 20 (A) |
| CPSA18 | 78 | 59 | 1.4 | 48 | 72 |
| CPSA19 | 61 | 78 | 1.2 | 50 (A) | 25 (A) |
| CPSA20 | 63 | 55 | 2.6 | 89 | 69 |
| CPSA21 | 75 | 48 | 2.4 | 67 | 21 |

[a]The glass substrates were stored in deionized water at room temperature for 24 hours, only taken from the water bath shortly before measurement, conditioned in the air for 10 minutes and also bonded in the wet state.
[c]The measurements were made as per measurement method VIII, with the additional feature that prior to the measurements, the sample was irradiated with UV as described above and the measurement took place after five minutes.
[d]In the absence of any details regarding the fracture mode, the adhesive undergoes cohesive failure. A = adhesive failure.

It can be seen from the microshear travel values that all of the PSA examples are crosslinked by the UV irradiation; in the case of the additional boost in cohesion through the use of epoxy monomers, the crosslinking is in some cases so strong that there is adhesive failure in the dynamic shear test. The inventive examples (PSA1 and PSA9), even after irradiation, exhibit not only good adhesive properties, determined by probe tack measurement, but also very good dynamic shear strengths, including particularly on wet glass. The comparative examples with the base polymer CA4 (CPSA10 to CPSA15) exhibit only very low dynamic shear strengths on wet glass, owing to the absence of the silane-modified acrylate monomer. The use of a silane which can be incorporated into the network through the cationic crosslinking (CPSA 12 and CPSA13) does produce a slight improvement in the dynamic shear strength, but the properties of the noncrosslinked PSA were not good. The use of a polymeric silane not bonded to the network exhibits an impairment in the dynamic shear strength on steel and a slight improvement on wet glass, but even in these examples the properties of the noncrosslinked systems were not satisfactory. The same results were obtained when the base polymer was changed. From comparative examples CPSA16 to CPSA19, however, it is apparent that the absence of an N-vinyl-substituted lactam comonomer leads to a drastic reduction in the adhesion. The admixing of further silanes to the inventive PSA Ac1 leads to a reduced dynamic shear strength.

The invention claimed is:
1. A pressure sensitive adhesive composition curable by UV or actinic radiation, comprising the following cationically polymerizable components:
   (a1) 35 to 90 wt % of at least one (meth)acrylic ester of the general formula (I)

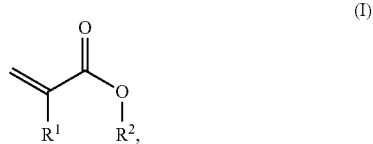

(I)

in which $R^1$ is selected from H and $CH_3$ and $R^2$ is a cyclic, linear or branched alkyl chain having 1 to 30 carbons;
   (a2) 5 to 30 wt % of at least one olefinically unsaturated monomer having at least one cationically polymerizable functional group;
   (a3) 5 to 30 wt % of at least one alkoxysilane-modified (meth)acrylic ester;
   (a4) 5 to 30 wt % of at least one N-vinyl-substituted lactam; and
   (a5) optionally up to 5 wt % of at least one (meth)acrylic ester different from (a1) and/or of at least one olefinically unsaturated monomer which is copolymerizable with components (a1) to (a4), wherein the foregoing weight percentages are based on the total mass of the composition.
2. The composition according to claim 1, comprising,
   45 to 80 wt %, of component (a1), and/or
   10 to 25 wt %, of component (a2), and/or
   10 to 25 wt %, of component (a3), and
   10 to 25 wt %, of component (a4).
3. The composition according to claim 1 wherein in formula (I), $R^2$ is a linear or branched alkyl chain having 1 to 14 carbons.
4. The composition according to claim 1, wherein component (a2) is selected from compounds of the formula (II)

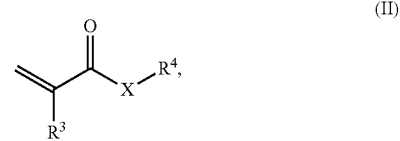

(II)

in which $R^3$ is H or $-CH_3$, X is $-NR^5-$ or $-O-$, $R^4$ is a linear, branched, cyclic or polycyclic hydrocarbon having 2 to 30 carbon atoms functionalized with at least one epoxide group and oxetane group, and,
   $R^5$ is H or $-CH_3$.
5. The composition according to claim 4, wherein component (a5) has a functional group which is thermally polymerizable but does not lead to thermal cationic polymerization of epoxide groups and/or oxetane groups present in component (a2).
6. The composition according to claim 1, wherein component (a3) is selected from:
   3-(triethoxysilyl)propyl methacrylate, 3-(triethoxysilyl) propyl acrylate, 3-(trimethoxysilyl)propyl acrylate, 3-(trimethoxysilyl)propyl methacrylate, methacryloyloxymethyltriethoxysilane, (methacryloyloxymethyl)trimethoxysilane, (3-acryloyloxypropyl)methyl-dimethoxysilane, (methacryloyloxymethyl)

methyldimethoxysilane, γ-methacryloyloxypropylmethyldimethoxysilane, methacryloyloxypropylmethyldiethoxysilane, 3-(dimethoxymethylsilyl)propyl methacrylate, methacryloyloxypropyldimethylethoxysilane, and, methacryloyloxypropyldimethylmethoxysilane.

7. The composition according to claim 1, wherein component (a4) is selected from:

N-vinylpyrrolidone, N-vinylpiperidone, N-vinylcaprolactam, and mixtures thereof.

8. The composition according to claim 1, wherein the composition further comprises at least one cationic photoinitiator.

9. A method of producing a pressure sensitive adhesive by polymerization of a composition according to claim 1, wherein the composition, during the polymerization or subsequently to polymerization, is subjected to a radiation-induced crosslinking reaction.

10. The composition of claim 1, wherein (a1) is selected from:

methyl (meth)acrylate, ethyl (meth)acrylate, propyl (meth)acrylate, n-butyl (meth)acrylate, n-pentyl (meth)acrylate, n-hexyl (meth)acrylate, n-heptyl acrylate, n-octyl acrylate, n-nonyl acrylate, lauryl acrylate, stearyl (meth)acrylate, behenyl acrylate, cyclohexyl (meth)acrylate, isobornyl (meth)acrylate, branched isomers thereof, and mixtures thereof.

11. The composition of claim 4, wherein, $R^4$ is an epoxy-functionalized hydrocarbon group.

12. The composition of claim 11, wherein $R^4$ is a linear, branched, cyclic or polycyclic hydrocarbon having 2 to 30 carbon atoms functionalized with an epoxy.

13. The composition of claim 12, wherein $R^4$ is a linear, branched, cyclic or polycyclic hydrocarbon having 2 to 30 carbon atoms comprising a 3,4-epoxycyclohexyl group.

14. The composition of claim 5, wherein component (a5) is selected from: benzyl (meth)acrylate, phenyl (meth)acrylate, tert-butylphenyl (meth)acrylate, phenoxyethyl (meth)acrylate, 2-butoxyethyl (meth)acrylate, N,N-dimethylaminoethyl (meth)acrylate, N,N-diethylaminoethyl (meth)acrylate, tetrahydrofurfuryl acrylate, hydroxyethyl (meth)acrylate, 3-hydroxypropyl (meth)acrylate, 4-hydroxybutyl (meth)acrylate, 6-hydroxyhexyl (meth)acrylate, cyanoethyl (meth)acrylate, allyl alcohol, acrylamide, N-tert-butylacrylamide, N-methylol (meth)acrylamide, N-(butoxymethyl)methacrylamide, N-(ethoxymethyl)acrylamide, N-isopropylacrylamide, styrene, methylstyrene, and 3,4-dimethoxystyrene.

* * * * *